(12) United States Patent
Misawa et al.

(10) Patent No.: US 11,262,266 B2
(45) Date of Patent: Mar. 1, 2022

(54) PRESSURE SENSOR

(71) Applicant: HITACHI AUTOMOTIVE SYSTEMS, LTD., Ibaraki (JP)

(72) Inventors: Tomonari Misawa, Tokyo (JP); Daisuke Terada, Hitachinaka (JP); Hiroshi Onuki, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 384 days.

(21) Appl. No.: 16/487,737

(22) PCT Filed: Nov. 17, 2017

(86) PCT No.: PCT/JP2017/041500
§ 371 (c)(1),
(2) Date: Aug. 21, 2019

(87) PCT Pub. No.: WO2018/154883
PCT Pub. Date: Aug. 30, 2018

(65) Prior Publication Data
US 2019/0376866 A1  Dec. 12, 2019

(30) Foreign Application Priority Data
Feb. 27, 2017 (JP) .............................. JP2017-035081

(51) Int. Cl.
*G01L 23/18* (2006.01)
*G01L 19/00* (2006.01)
(Continued)

(52) U.S. Cl.
CPC .......... *G01L 23/18* (2013.01); *G01L 19/0038* (2013.01); *G01L 19/0069* (2013.01);
(Continued)

(58) Field of Classification Search
CPC . G01L 19/0038; G01L 19/0069; G01L 19/04; G01L 19/148; G01L 23/18; G01L 27/005
See application file for complete search history.

(56) References Cited

U.S. PATENT DOCUMENTS

| 5,583,295 A | 12/1996 | Nagase et al. |
| 7,316,164 B2 | 1/2008 | Toyoda et al. |
| (Continued) | | |

FOREIGN PATENT DOCUMENTS

| EP | 0710827 A2 | 5/1995 |
| JP | H08-136384 A | 5/1996 |
| (Continued) | | |

OTHER PUBLICATIONS

International Search Report for PCT/JP2017/041500, dated Dec. 12, 2017.

*Primary Examiner* — Nimeshkumar D Patel
*Assistant Examiner* — Jean F Morello
(74) *Attorney, Agent, or Firm* — Volpe Koenig

(57) ABSTRACT

A pressure sensor which detects a combustion pressure of an engine includes: a contact part which is in direct or indirect contact with a casing of the engine when the pressure sensor is attached to the engine; and a pressure detection unit which detects the combustion pressure and outputs a signal corresponding to the combustion pressure, wherein the pressure detection unit includes a pressure detection element which detects the combustion pressure and outputs a signal, and a circuit unit which converts the signal obtained from the pressure detection element into a signal corresponding to the combustion pressure, and the pressure detection unit is provided at a location positioned more inside the engine than the contact part when the pressure sensor is attached to the engine.

5 Claims, 13 Drawing Sheets

(51) Int. Cl.
*G01L 19/04* (2006.01)
*G01L 19/14* (2006.01)
*G01L 27/00* (2006.01)
*F02D 45/00* (2006.01)

(52) U.S. Cl.
CPC ............ *G01L 19/04* (2013.01); *G01L 19/148* (2013.01); *G01L 27/005* (2013.01); *F02D 45/00* (2013.01)

(56) References Cited

U.S. PATENT DOCUMENTS

| | | | |
|---|---|---|---|
| 2009/0320576 A1* | 12/2009 | Borgers | ................. F23Q 7/001 73/114.18 |
| 2014/0283586 A1 | 9/2014 | Berkel et al. | |
| 2019/0323915 A1* | 10/2019 | Kaga | ....................... G01L 23/28 |

FOREIGN PATENT DOCUMENTS

| | | | |
|---|---|---|---|
| JP | 3365028 | B2 | 1/2003 |
| JP | 4742593 | B2 | 8/2011 |
| JP | 2014-182127 | A | 9/2014 |

\* cited by examiner

[FIG. 1]
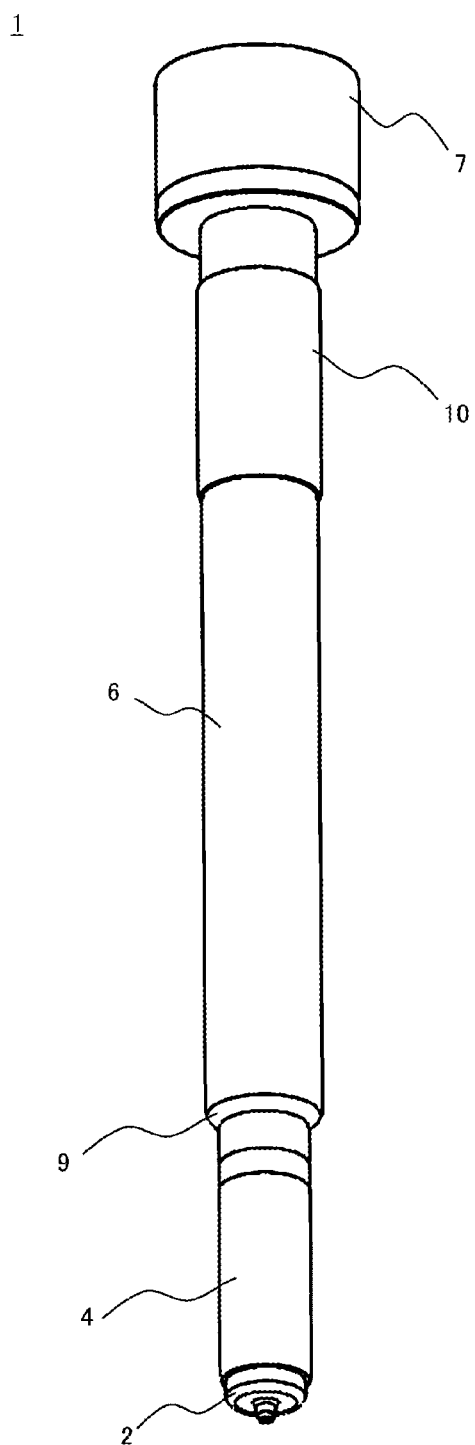

[FIG. 2]
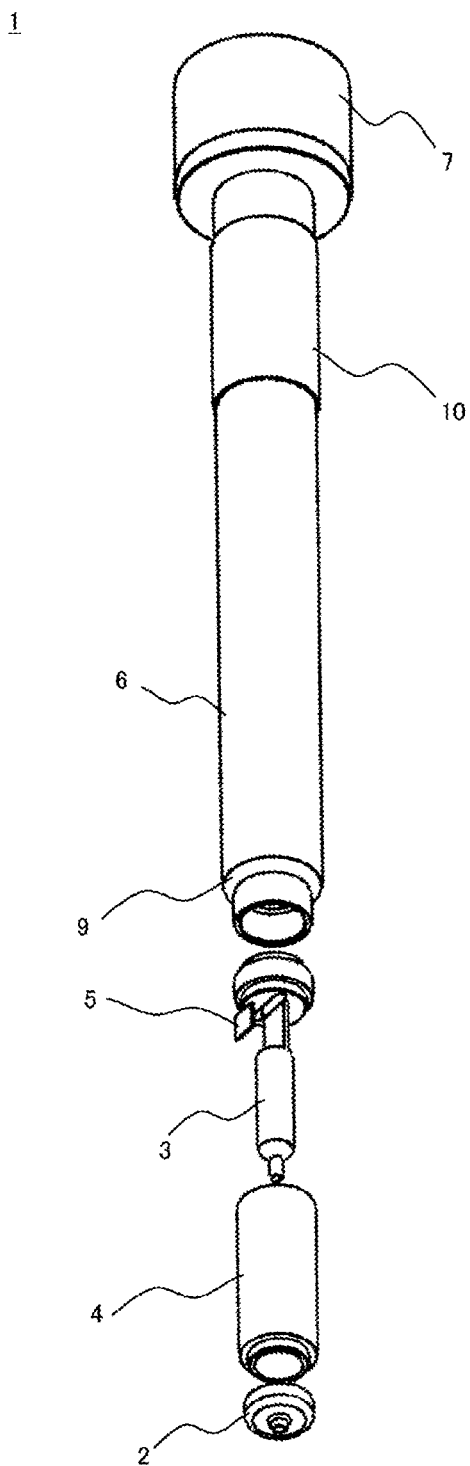

[FIG. 3]
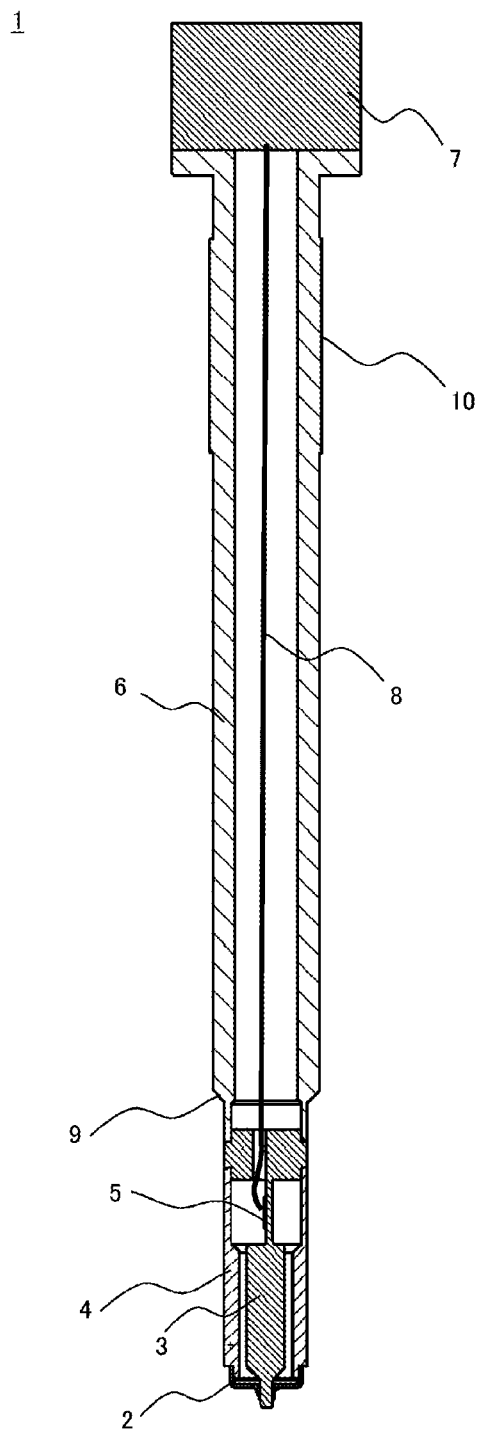

[FIG. 4]
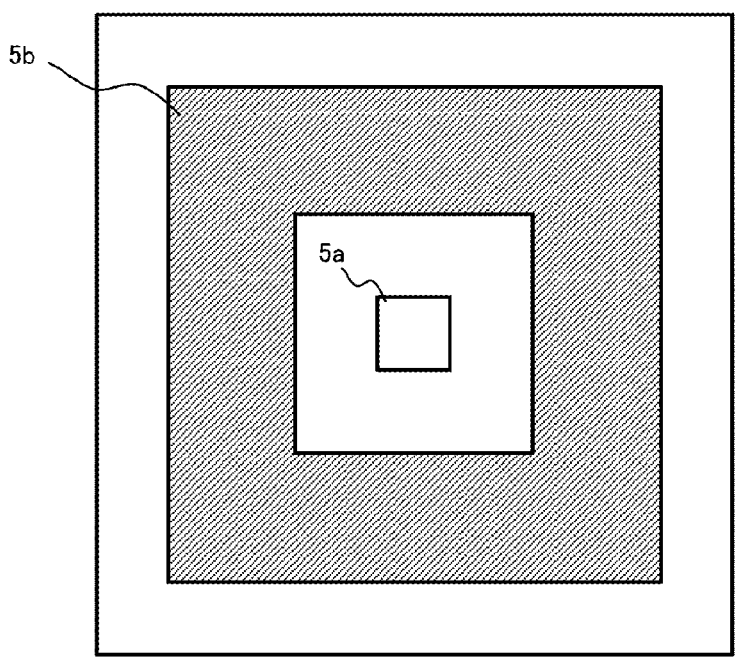

[FIG. 5]
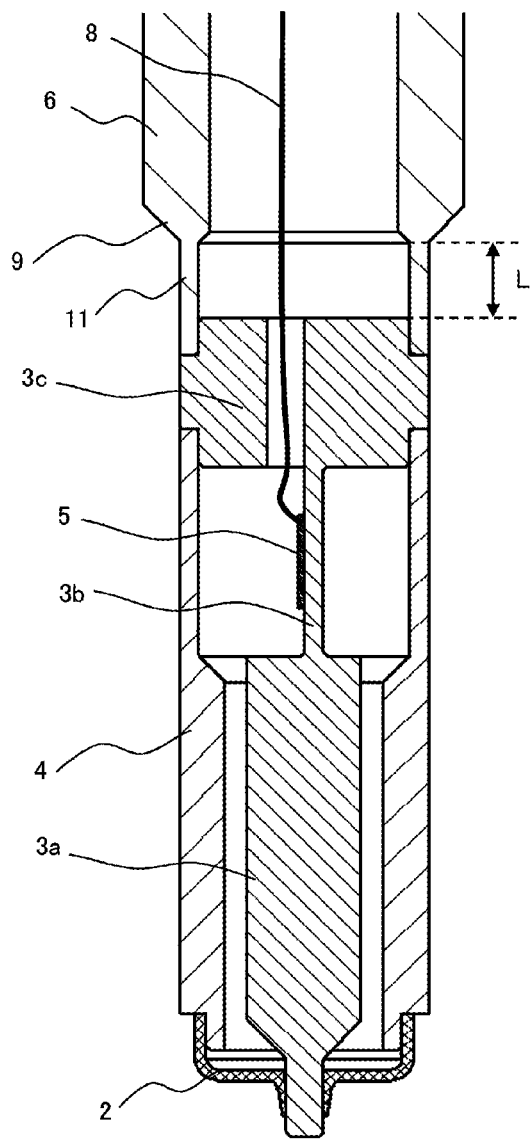

[FIG. 6]
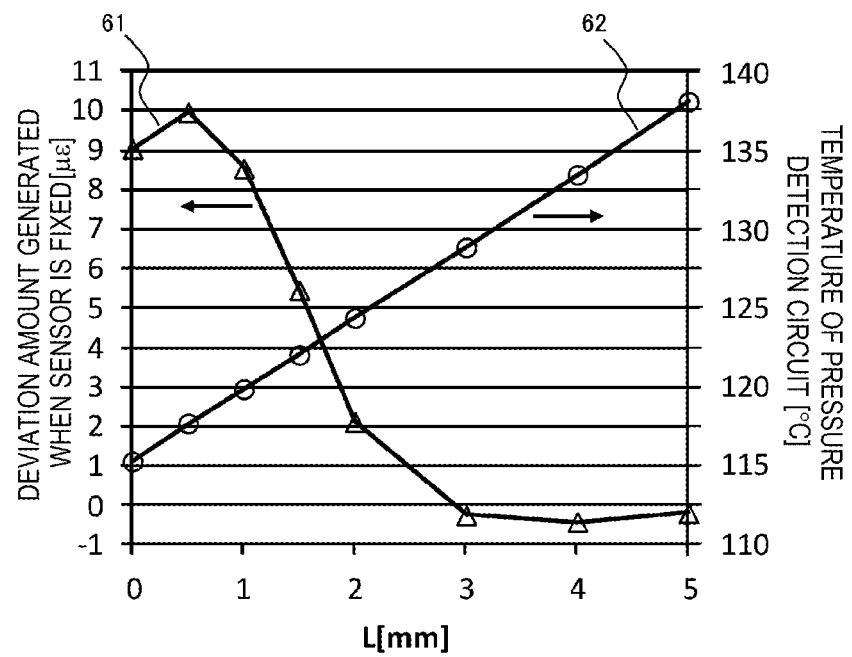

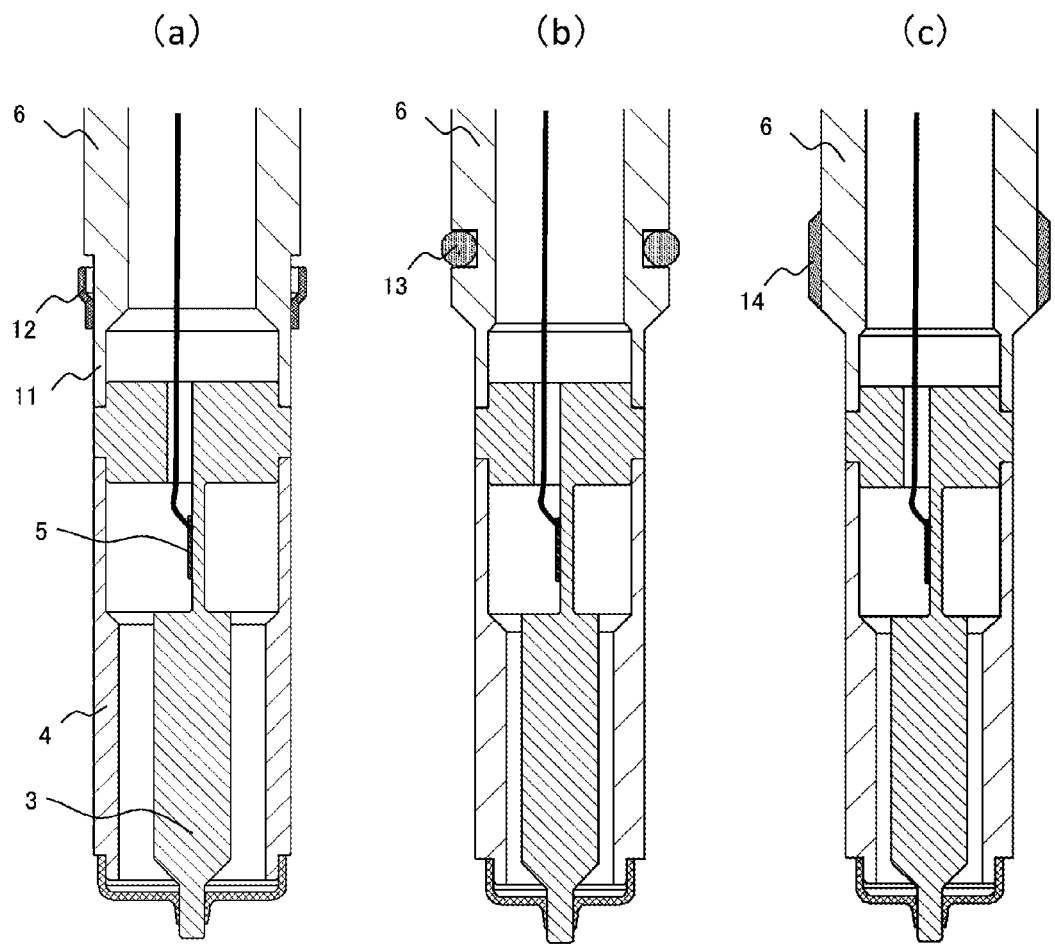
[FIG. 7]

[FIG. 8]
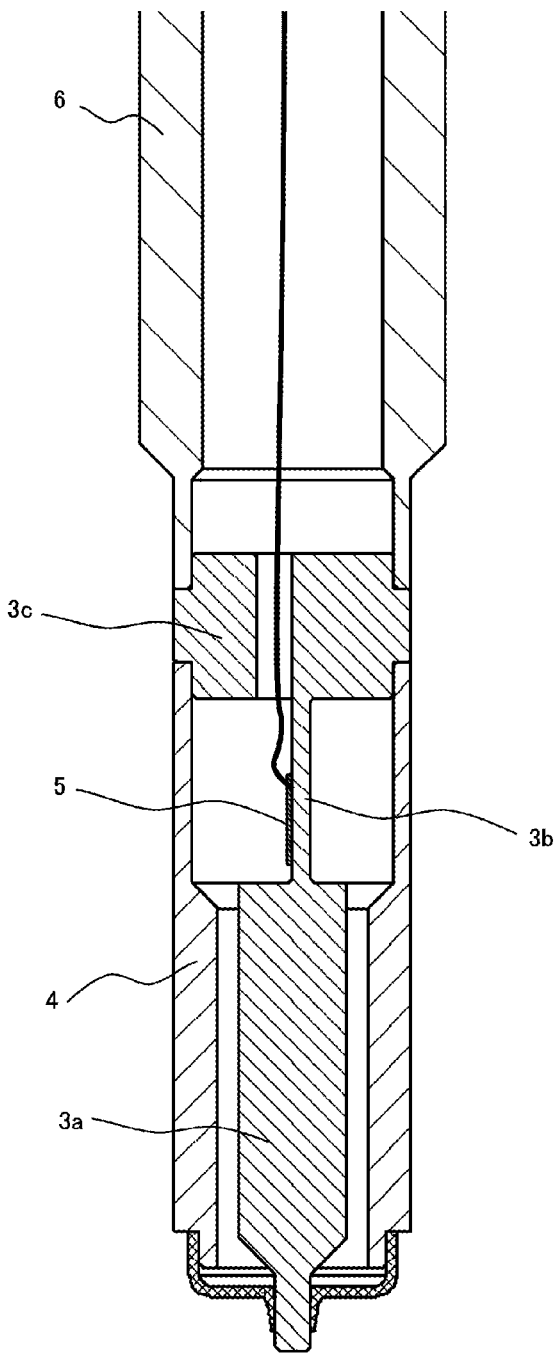

[FIG. 9]
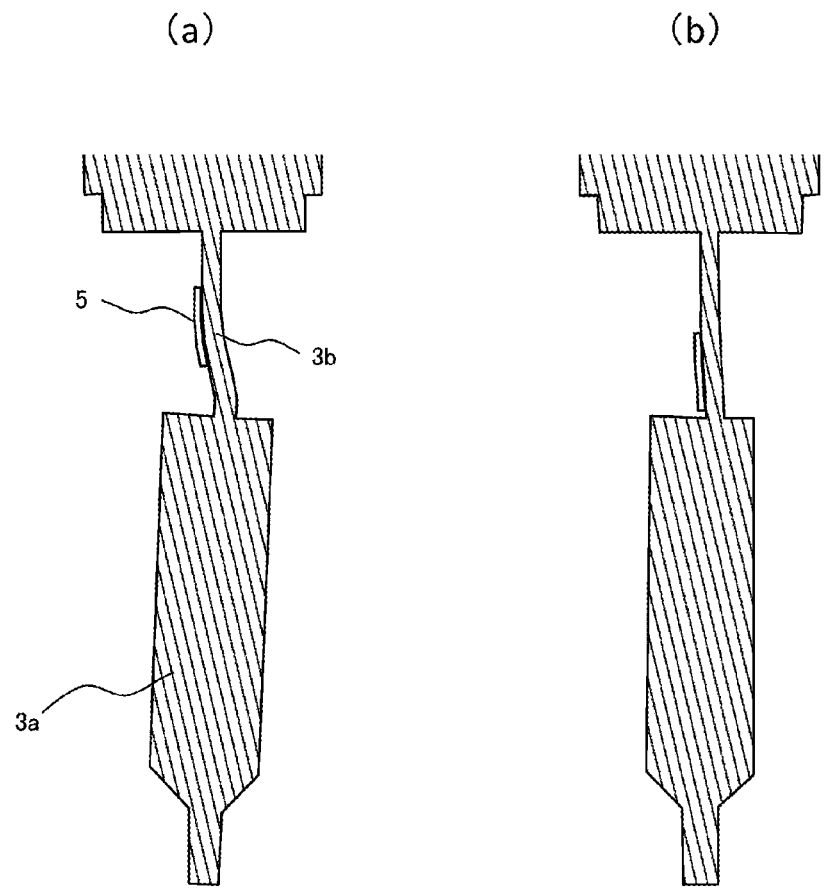

[FIG. 10]
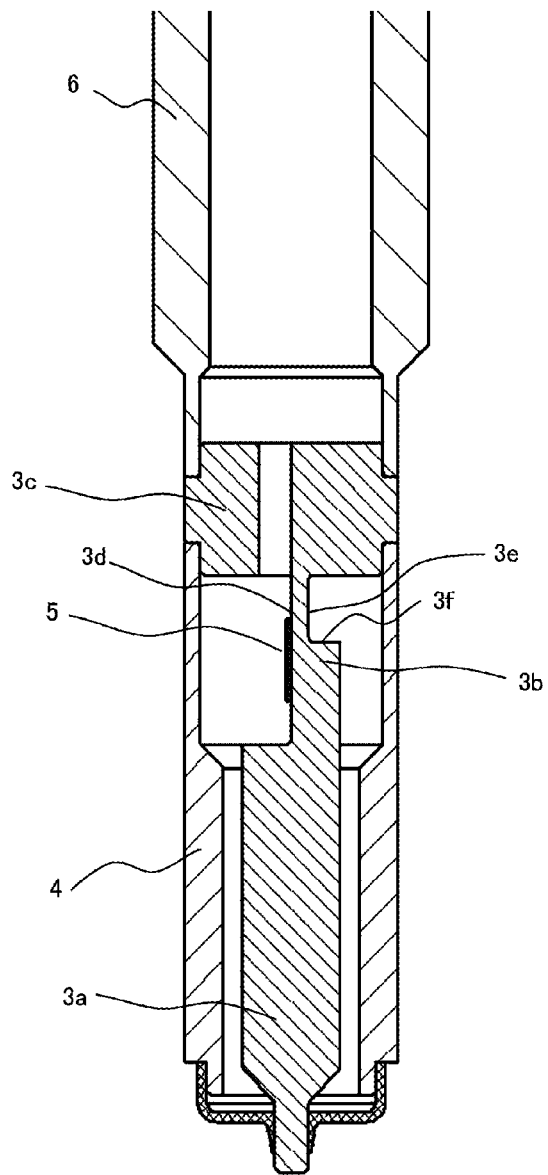

[FIG. 11]
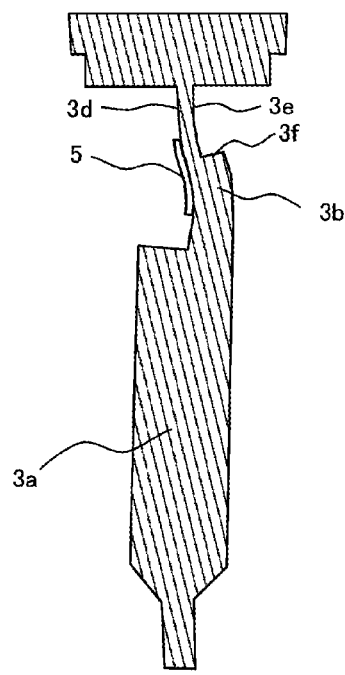

[FIG. 12]
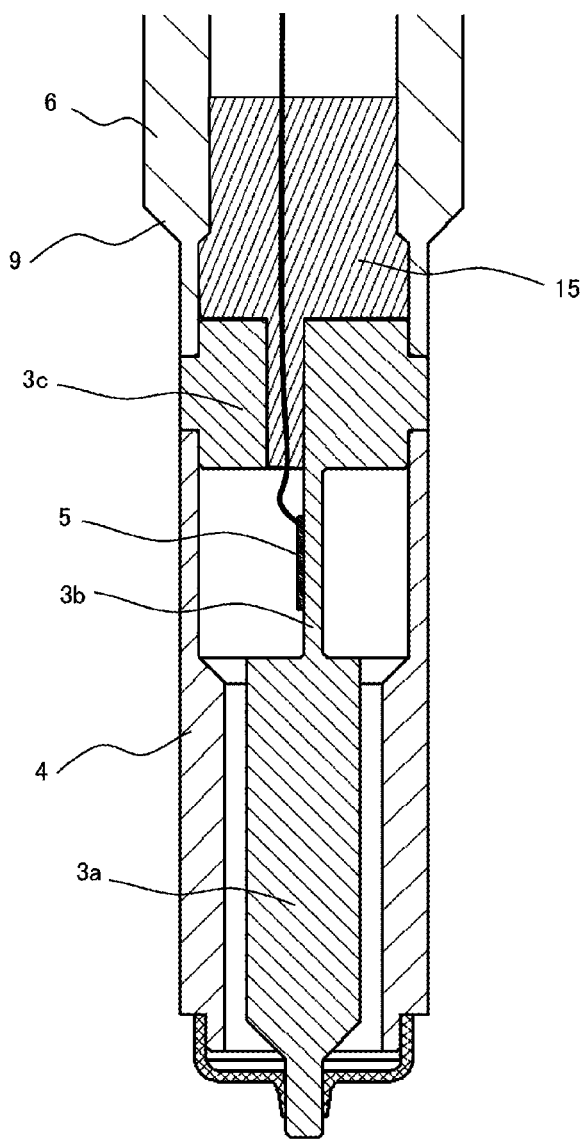

[FIG. 13]
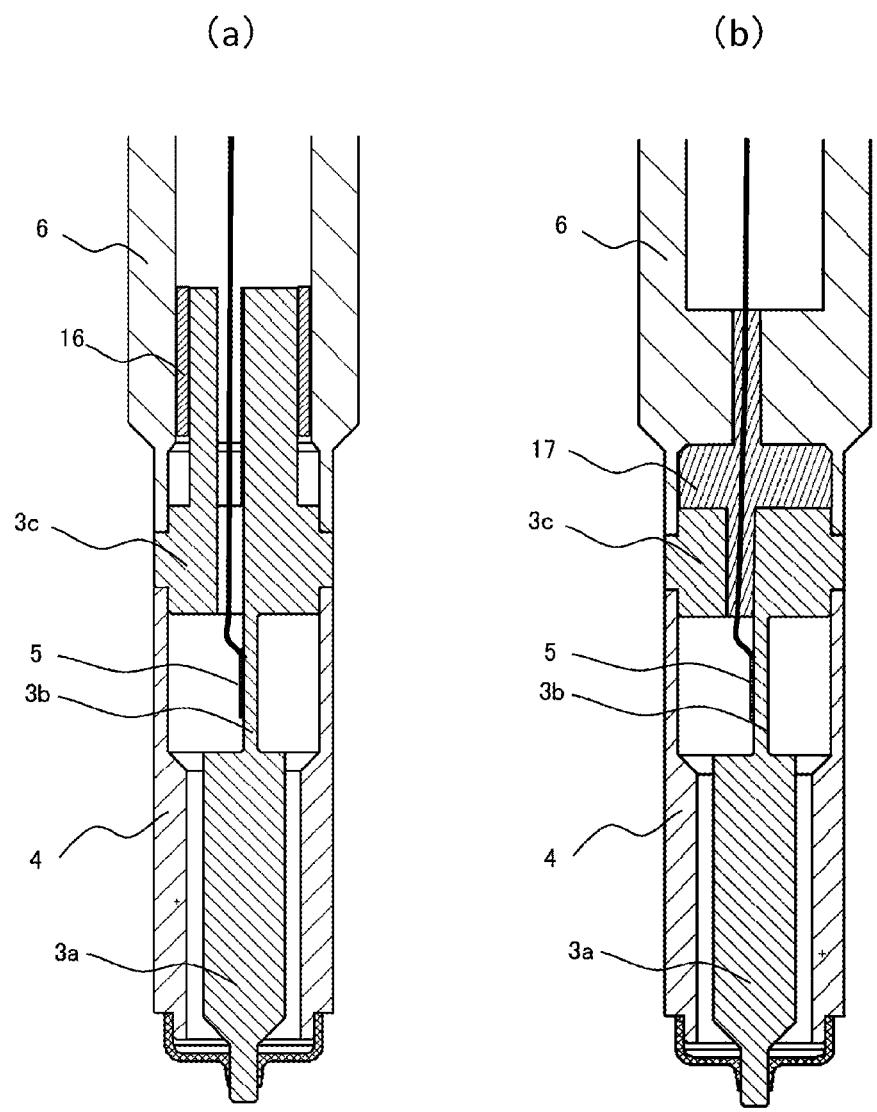

PRESSURE SENSOR

TECHNICAL FIELD

The present invention relates to a pressure sensor.

BACKGROUND ART

A pressure sensor which detects a combustion pressure of an engine is known in the related art. PTL 1 describes a pressure measuring plug which includes a sensing structure where a sensing element is attached and an electronic circuit which processes a signal obtained from the sensing element, in which the sensing structure is disposed at a position close to a combustion chamber of a combustion engine and the electronic circuit is disposed outside the combustion engine away from the sensing structure.

PRIOR ART LITERATURE

Patent Literature

PTL 1: JP-A-2014-182127

SUMMARY OF INVENTION

Technical Problem

In the pressure measuring plug of PTL 1, since the sensing element and the electronic circuit are disposed separately, there is a problem that noise from the outside is easily received in a wiring connecting the sensing element and the electronic circuit, and detection accuracy is deteriorated.

Solution to Problem

The pressure sensor according to the invention is a pressure sensor which detects a combustion pressure of an engine, and the pressure sensor includes: a contact part which is in direct or indirect contact with a casing of the engine when the pressure sensor is attached to the engine; and a pressure detection unit which detects the combustion pressure and outputs a signal corresponding to the combustion pressure, wherein the pressure detection unit includes a pressure detection element which detects the combustion pressure and outputs a signal, and a circuit unit which converts the signal obtained from the pressure detection element into a signal corresponding to the combustion pressure, and the pressure detection unit is provided at a location positioned more inside the engine than the contact part when the pressure sensor is attached to the engine.

Advantageous Effect

According to the invention, a pressure sensor which is resistant to external noise and has improved detection accuracy can be provided.

BRIEF DESCRIPTION OF DRAWINGS

FIG. 1 is an appearance view of a pressure sensor according to one embodiment of the invention.

FIG. 2 is an exploded view of the pressure sensor according to the embodiment of the invention.

FIG. 3 is a cross-sectional view of the pressure sensor according to the embodiment of the invention.

FIG. 4 is a view illustrating a schematic configuration of a pressure detection unit.

FIG. 5 is an enlarged cross-sectional view of a pressure sensor according to a first embodiment of the invention.

FIG. 6 is a diagram illustrating an example of a relationship of a strain amount of an element providing part and a temperature of a circuit unit with respect to a length L of a stress absorbing part.

FIG. 7 is a view illustrating a modification of a contact part.

FIG. 8 is an enlarged cross-sectional view of a pressure sensor according to a second embodiment of the invention.

FIG. 9 is a schematic view illustrating a deformed state of the element providing part during pressure receiving in the first embodiment and the second embodiment of the invention.

FIG. 10 is an enlarged cross-sectional view of a pressure sensor according to a third embodiment of the invention.

FIG. 11 is a schematic view illustrating a deformed state of the element providing part during pressure receiving in the third embodiment of the invention.

FIG. 12 is an enlarged cross-sectional view of a pressure sensor according to a fourth embodiment of the invention.

FIG. 13 is a view illustrating a modification of a thermally conductive material.

DESCRIPTION OF EMBODIMENTS

Embodiments of the invention will be described below with reference to the drawings.

First Embodiment

A pressure sensor according to a first embodiment of the invention will be described with reference to FIG. 1 to FIG. 3. FIG. 1 is an appearance view of the pressure sensor according to one embodiment of the invention. FIG. 2 is an exploded view of the pressure sensor according to the embodiment of the invention. FIG. 3 is a cross-sectional view of the pressure sensor according to the embodiment of the invention.

A pressure sensor 1 is attached to an engine, which is an internal combustion engine of a vehicle or the like, detects a combustion pressure of the engine and outputs a sensor output corresponding to the combustion pressure to the outside. As shown in FIG. 1, the pressure sensor 1 includes a diaphragm 2, a cover 4, a casing 6, and a terminal part 7. The casing 6 is provided with a screw part 10 which is configured to fix the pressure sensor 1 to the casing of the engine, and a contact part 9 which contacts the casing of the engine when the pressure sensor 1 is attached to the engine.

As shown in FIG. 2 and FIG. 3, a pressure transmission rod 3 and a pressure detection unit 5 are housed inside the cover 4. The pressure detection unit 5 and the terminal part 7 are connected via a signal line 8.

The diaphragm 2 is disposed in contact with the pressure transmission rod 3 and the cover 4. With this disposition, the diaphragm 2 has a function of applying a compressive force to the pressure transmission rod 3 by receiving the combustion pressure of the engine for deformation, and a function of inhibiting combustion gas inside the engine from intruding into the pressure sensor 1.

The pressure detection unit 5 is provided in the pressure transmission rod 3. The pressure transmission rod 3 acts as a pressure transmission mechanism which transmits the combustion pressure of the engine to the pressure detection unit 5 by generating a strain within a range including the providing position of the pressure detection unit 5 according to the compressive force received from the diaphragm 2. The pressure detection unit 5 detects the combustion pressure of the engine by detecting the strain of the pressure transmission rod 3, and outputs a pressure signal corresponding to the detection result to the terminal part 7 via the signal line 8. The pressure signal is output as a sensor output from the terminal part 7 to the outside of the pressure sensor 1. A circuit which generates a sensor output by performing signal processing such as output adjustment with respect to the pressure signal obtained from the pressure detection unit 5 and outputs the sensor output to the outside may be provided in the terminal part 7.

FIG. 4 is a view illustrating a schematic configuration of the pressure detection unit 5. As shown in FIG. 4, in the pressure detection unit 5, a pressure detection element 5a provided in a central part for example, and a circuit unit 5b provided around the pressure detection element 5a are formed on the same substrate. The pressure detection element 5a is configured using, for example, a strain gauge, and detects the combustion pressure of the engine by detecting a strain amount generated in the pressure transmission rod 3 according to the combustion pressure of the engine. The pressure detection element 5a outputs a signal corresponding to the detected strain amount, that is, the combustion pressure of the engine, to the circuit unit 5b. The circuit unit 5b performs signal processing with respect to the signal obtained from the pressure detection element 5a, converts the signal into a pressure signal corresponding to the sensor output and outputs the pressure signal to the terminal part 7. The circuit unit 5b has a function of performing analog amplification on a weak signal obtained from the pressure detection element 5a and a function of converting a weak signal obtained from the pressure detection element 5a into a digital signal. Further, the circuit unit 5b may have a function of detecting an ambient temperature and performing temperature correction. In the pressure detection unit 5, since the pressure detection element 5a is in the vicinity of the circuit unit 5b, the temperature correction can be performed with respect to the signal from the pressure detection element 5a by using a temperature sensor built in the circuit unit 5b. Therefore, the temperature correction can be realized with an inexpensive configuration.

In the pressure sensor 1 of the present embodiment, as described above, the pressure detection element 5a and the circuit unit 5b are formed on the same substrate in the pressure detection unit 5. Therefore, the wiring length which connects the pressure detection element 5a and the circuit unit 5b is greatly reduced, and as a result, an influence of external noise can be reduced. Although a configuration is shown in the present embodiment that the pressure detection element 5a and the circuit unit 5b are formed on the same substrate, they may also be separately disposed on separate substrates as long as they are close enough to sufficiently reduce the influence of noise.

Here, the pressure detection unit 5 is provided at a location positioned more inside the engine than the contact part 9 when the pressure sensor 1 is attached to the engine. Since the circuit unit 5b is generally lower in heat resistance than the pressure detection element 5a, in order to dispose the circuit unit 5b in the vicinity of the pressure detection element 5a, a structure in which heat in the circuit unit 5b can be sufficiently dissipated is required in the pressure sensor 1. In the present embodiment, as described above, a heat dissipation structure of the circuit unit 5b is realized by contacting the contact part 9 with the casing of the engine when the pressure sensor 1 is attached to the engine. That is, the contact part 9 is disposed in the vicinity of a pressure detection structure configured by the pressure transmission rod 3 and the pressure detection unit 5, and has a heat dissipation function of dissipating heat of the pressure detection structure to the casing of the engine through thermal contact. In addition, the contact part 9 has a shielding function of blocking high-temperature combustion gas inside the engine by coming into close contact with the casing of the engine and inhibiting combustion gas from intruding into a more rear end side of the pressure sensor 1 than the contact part 9. Since the contact part 9 has these functions, it is possible to inhibit a temperature rise of the circuit unit 5b having a relatively low heat resistance temperature. The contact part 9 may have only one of the heat dissipation function and the shielding function if the temperature rise of the circuit unit 5b can be sufficiently inhibited. Further, as long as the heat dissipation function and the shielding function can be sufficiently exhibited, the contact between the contact part 9 and the casing of the engine may be direct or indirect via another member.

FIG. 5 is an enlarged cross-sectional view of a part including the pressure detection structure of the pressure sensor 1 according to the first embodiment of the invention. As shown in FIG. 5, the pressure transmission rod 3 includes a pressure transmission part 3a, an element providing part 3b, and a high rigidity part 3c.

The pressure transmission part 3a is in contact with the diaphragm 2, and is provided at a location positioned more inside the engine than the element providing part 3b and the high rigidity part 3c when the pressure sensor 1 is attached to the engine. The pressure transmission part 3a transmits a compressive force received from the diaphragm 2 to the element providing part 3b.

The element providing part 3b has a rigidity lower than that of the high rigidity part 3c, and is a part which generates a strain corresponding to the compressive force transmitted from the pressure transmission part 3a. A flat surface having a shape where a part of the pressure transmission part 3a is cut is formed on the element providing part 3b, and the pressure detection unit 5 is fixed to the flat surface. Accordingly, the strain amount of the providing part of the pressure detection element 5a in the element providing part 3b is detected by the pressure detection element 5a, and the combustion pressure of the engine corresponding to the strain amount is detected. In addition, a flat surface having a shape where a part of the pressure transmission part 3a is cut is also formed on a side opposite to the surface to which the pressure detection unit 5 is fixed in the element providing part 3b. Accordingly, in an axial direction of the pressure sensor 1, that is, an insertion direction of the pressure sensor 1 when the pressure sensor 1 is attached to the engine, the cross-sectional area of the surface perpendicular to the direction is reduced, and the rigidity of the element providing part 3b is relatively reduced. As a result, the strain amount of the element providing part 3b can be increased, and detection sensitivity can be improved.

The high rigidity part 3c is provide to have a cross-sectional area perpendicular to the axial direction of the pressure sensor 1 larger than that of the element providing part 3b, and has a rigidity higher than that of the element providing part 3b. Accordingly, the high rigidity part 3c has a function of maximizing the strain amount in the element providing part 3b after receiving the compressive force transmitted from the pressure transmission part 3a.

The high rigidity part 3c is disposed between the element providing part 3b and the contact part 9, and is connected to the element providing part 3b more inside the engine than the contact part 9 when the pressure sensor 1 is attached to the engine. Therefore, when the pressure sensor 1 is fixed to the engine, deformation of the pressure sensor 1 generated starting from the contact part 9 is attenuated in the high rigidity part 3c, and the generation of the strain in the element providing part 3b can be inhibited. As a result, a variation in the sensor output generated during the attachment of the pressure sensor 1 can be inhibited. In FIG. 3 and FIG. 5, a configuration is shown that the high rigidity part 3c is disposed between the casing 6 and the cover 4, and the high rigidity part 3c is in direct contact with the casing 6, but the high rigidity part 3c may also configured to be in indirect contact with the casing 6. For example, the high rigidity part 3c may also be configured to connect to the casing 6 via the cover 4 by joining the casing 6 and the cover 4 through welding or the like and disposing the high rigidity part 3c in contact with the cover 4.

A stress absorbing part 11, which is a part of the casing 6, is provided between the high rigidity part 3c and the contact part 9. The stress absorbing part 11 is apart for absorbing a deformation stress generated by contacting the contact part 9 with the casing of the engine. The stress absorbing part 11 has a rigidity lower than that of the high rigidity part 3c and thus has a stress reduction function of reducing the stress applied to the high rigidity part 3c by the deformation of the pressure sensor 1 generated starting from the contact part 9 when the pressure sensor 1 is fixed to the engine.

FIG. 6 is a diagram illustrating an example of a relationship of the strain amount of the element providing part 3b generated when the pressure sensor 1 is fixed and the temperature of the circuit unit 5b in the pressure detection unit 5 during engine combustion with respect to the length L of the stress absorbing part 11. In FIG. 6, a graph 61 represents the strain amount of the element providing part 3b, and a graph 62 represents the temperature of the circuit unit 5b. As shown in the graph 61, as the length L of the stress absorbing part 11 becomes longer, a higher effect due to the stress reduction function can be obtained, so that the strain amount of the element providing part 3b can be reduced. However, as shown in the graph 62, as the length L of the stress absorbing part 11 becomes longer, the thermal conductivity from the pressure detection unit 5 to the contact part 9 is lowered, so that the temperature of the circuit unit 5b rises. That is, the effect of the stress reduction function of the stress absorbing part 11 is in a trade-off relationship with respect to a heat dissipation property of the pressure detection unit 5.

In FIG. 6, the strain amount of the element providing part 3b generated when the pressure sensor 1 is fixed is substantially saturated when the length L of the stress absorbing part 11 is 3 mm or more as shown in the graph 61. On the other hand, the temperature of the circuit unit 5b rises in proportion to the length L of the stress absorbing part 11, as shown in the graph 62. Therefore, if the pressure detection unit 5 is designed such that the temperature of the circuit unit 5b is equal to or lower than the heat resistance temperature when the length L of the stress absorbing part 11 is about 3 mm, it is possible to secure the necessary heat dissipation property while maximizing the effect of the stress reduction function of the stress absorbing part 11. For example, by designing the heat resistance temperature of the circuit unit 5b to 150° C., the strain amount of the element providing part 3b is inhibited when the length L of the stress absorbing part 11 is 3 mm, and the variation in the sensor output generated during the attachment of the pressure sensor 1 can be minimized. If the necessary sensor output is obtained, it is advantageous in cost when the heat resistance temperature of the circuit unit 5b is as low as possible, so that the above length L of 3 mm or the heat resistance temperature of 150° C. is merely an example and is not limited thereto.

As described above, in the pressure sensor 1, the pressure transmission part 3a, the element providing part 3b, and the high rigidity part 3c are integrally formed as the pressure transmission rod 3. In addition, the high rigidity part 3c and the stress absorbing part 11 are integrated through welding or the like. Further, the stress absorbing part 11 is formed continuously and integrally with the contact part 9. With such a configuration, the element providing part 3b is thermally and continuously connected to the contact part 9 via the high rigidity part 3c and the stress absorbing part 11, and the heat in the pressure detection unit 5 provided in the element providing part 3b can be efficiently dissipated to the casing of the engine to which the pressure sensor 1 is attached. Accordingly, even in the circuit unit 5b having a low heat resistance, the temperature rise of the circuit unit 5b can be inhibited to be equal to or lower than the heat resistance temperature. As long as the element providing part 3b, the high rigidity part 3c, the stress absorbing part 11, and the contact part 9 can be connected to each other in a thermal and continuous manner, any connection method such as integral formation, welding, soldering, brazing, press fitting, and shrink fitting can be used. In addition, the high rigidity part 3c may also be in direct contact with the contact part 9 without providing the stress absorbing part 11.

Further, in order to efficiently dissipate heat in the pressure detection unit 5, a heat transfer distance from the pressure detection unit 5 to the contact part 9 is preferably to be short. In the configuration of the pressure sensor 1 according to the present embodiment, since a path, through which the heat is transferred, without diverting from the pressure detection unit 5 to the contact part 9 is formed, efficient heat dissipation can be obtained.

As described above, according to the pressure sensor 1 of the present embodiment, the wiring length connecting the pressure detection element 5a and the circuit unit 5b is significantly reduced while the temperature rise of the circuit unit 5b in the pressure detection unit 5 is inhibited. Therefore, the influence of the external noise can be reduced.

According to the first embodiment of the invention described above, the following effects can be obtained.

(1) The pressure sensor 1 which detects the combustion pressure of the engine includes: the contact part 9 which is indirect or indirect contact with the casing of the engine when the pressure sensor 1 is attached to the engine; and the pressure detection unit 5 which detects the combustion pressure of the engine and outputs the sensor output to the outside of the pressure sensor 1. The pressure detection unit 5 includes the pressure detection element 5a which detects the combustion pressure of the engine and outputs a signal, and the circuit unit 5b which converts the signal obtained from the pressure detection element 5a into a pressure signal corresponding to the sensor output. The pressure detection unit 5 is provided at a location positioned more inside the engine than the contact part 9 when the pressure sensor 1 is attached to the engine. As a result, a pressure sensor which is resistant to external noise and has improved detection accuracy can be provided.

(2) The pressure sensor 1 further includes the pressure transmission rod 3 which is a pressure transmission mechanism configured to transmit the combustion pressure of the engine to the pressure detection element 5a. At least a part of the pressure transmission rod 3 is provided at a location positioned more inside the engine than the circuit unit 5b when the pressure sensor 1 is attached to the engine. As a result, the combustion pressure of the engine in the pressure detection element 5a can be detected while the temperature rise of the circuit unit 5b is inhibited as much as possible.

(3) The pressure sensor 1 further includes the stress absorbing part 11 which is between the contact part 9 and the pressure detection unit 5 and is configured to absorb the deformation stress generated by contacting the contact part 9 with the casing of the engine. As a result, the strain amount of the element providing part 3b generated when the pressure sensor 1 is fixed can be reduced, and the variation in the sensor output can be inhibited.

(4) The pressure transmission rod 3 includes the element providing part 3b on which the pressure detection element 5a is provided, and the high rigidity part 3c which is disposed between the element providing part 3b and the stress absorbing part 11 or between the element providing part 3b and the contact part 9, and has a rigidity higher than that of the element providing part 3b. As a result, the strain amount in the element providing part 3b can be increased, and the detection sensitivity of the pressure sensor 1 with respect to the combustion pressure of the engine can be improved.

(Modification of Contact Part)

In the first embodiment of the invention described above, as a shape of the contact part in contact with the casing of the engine when the pressure sensor 1 is attached to the engine, an example of the contact part 9 formed by providing a step in the casing 6 of the pressure sensor 1 is shown, but the contact part in contact with the casing of the engine may have another shape. A modification of the contact part will be described below with reference to FIG. 7.

FIG. 7 illustrates the modifications of the contact part in the pressure sensor 1. FIG. 7(*a*) illustrates an example in which a contact member 12 formed of a member different from that of the casing 6 is provided on the side surface of the casing 6 as a contact part of the pressure sensor 1. The contact member 12 is formed of a thermally conductive elastic material such as metal, and is fixed to the side surface of the casing 6 by brazing, an adhesive, press fitting, caulking, welding or the like. An outer diameter of the contact member 12 is set to be slightly larger than a diameter of an introduction hole of the pressure sensor 1 provided in the casing of the engine. When the pressure sensor 1 is attached to the engine, contact with the casing of the engine is obtained due to the elasticity of the contact member 12.

In addition, as a contact part of the pressure sensor 1, an O-ring 13 as illustrated in FIG. 7(*b*) may be provided on the side surface of the casing 6 of the pressure sensor 1. In a state where the pressure sensor 1 is attached to the engine, the O-ring 13 is brought into close contact with the casing of the engine, so that the high-temperature combustion gas in the engine is inhibited from intruding into a more rear end side of the pressure sensor 1 than the O-ring 13. Accordingly, the temperature rise of the circuit unit 5b in the pressure detection unit 5 can be inhibited.

In addition, as a contact part of the pressure sensor 1, a thermally conductive elastic body 14 as illustrated in FIG. 7(*c*) may be provided on the side surface of the casing 6 of the pressure sensor 1. The thermally conductive elastic body 14 is formed of an elastic material having high thermal conductivity, such as a resin material mixed with, for example, thermally conductive rubber, metal powder, and ceramic powder, and is fixed to the side surface of the casing 6 by an adhesive, press fitting, insert molding, welding or the like. An outer diameter of the thermally conductive elastic body 14 is set to be slightly larger than the diameter of the introduction hole of the pressure sensor 1 provided in the casing of the engine. When the pressure sensor 1 is attached to the engine, contact with the casing of the engine is obtained due to the elasticity of the thermally conductive elastic body 14.

Second Embodiment

Next, a second embodiment of the invention will be described. In the present embodiment, an example will be described in which the pressure detection sensitivity is further improved in the pressure sensor 1 described in the first embodiment.

FIG. 8 is an enlarged cross-sectional view of a part including the pressure detection structure of the pressure sensor 1 according to the second embodiment of the invention. In the present embodiment, the providing position of the pressure detection unit 5 in the element providing part 3b is different from that of the structure of the first embodiment described with reference to FIG. 5. Specifically, in the structure shown in FIG. 8, the pressure detection unit 5 including the pressure detection element 5a is provided at a position in the element providing part 3b where the center of the pressure detection unit 5 (pressure detection element 5a) in the axial direction of the pressure sensor 1, that is, the insertion direction of the pressure sensor 1 when the pressure sensor 1 is attached to the engine, is closer to the pressure transmission part 3a than the center of the element providing part 3b in this direction. Accordingly, the detection sensitivity of the pressure sensor 1 with respect to the combustion pressure of the engine is further improved than in the first embodiment. Other structures are the same as those of the first embodiment.

The reason why the pressure detection sensitivity of the pressure sensor 1 is improved in the present embodiment will be described below with reference to FIG. 9. FIG. 9 illustrates schematic views illustrating deformed states of the element providing part 3b during pressure receiving in the first embodiment and the second embodiment of the invention. FIG. 9(*a*) shows a deformed state in the configuration of the first embodiment, and FIG. 9(*b*) shows a deformed state in the configuration of the present embodiment.

In the first embodiment, as shown in FIG. 5, the pressure detection unit 5 is disposed substantially at the center of the element providing part 3b in the axial direction of the pressure sensor 1. In the deformed state of the element providing part 3b during pressure receiving in such a structure, as shown in FIG. 9(*a*), the pressure transmission part 3a is inclined with respect to the axial direction. Therefore, of two flat surfaces formed on the element providing part 3b, in a flat surface on the side where the pressure detection unit 5 is provided, deformation occurs that the vicinity of the providing part of the pressure detection unit 5 becomes a convex and the vicinity of the connection part with the pressure transmission part 3a becomes a concave. This is because when the pressure detection unit 5 is provided on one flat surface of the element providing part 3b, the rigidity of the providing part is relatively high and the providing part is less likely to be compressed. Accordingly, the element providing part 3b which should be compressed in the axial direction after receiving the compressive force transmitted from the pressure transmission part 3a deforms into the shape as described above, and as a result, the compression is relaxed and the strain amount generated in the pressure detection element 5a is reduced. As a result, the pressure detection sensitivity of the pressure sensor 1 may be lowered.

On the other hand, in the deformed state of the element providing part 3b during pressure receiving in the structure of the present embodiment, as shown in FIG. 9(b), the deformation that the pressure transmission part 3a is inclined with respect to the axial direction is inhibited. This is because when the providing position of the pressure detection unit 5 in the element providing part 3b is set as described above, the pressure detection unit 5 is provided in the vicinity of the connection part with the pressure transmission part 3a deformed into the concave in FIG. 9(a), so that the above deformation is inhibited. As a result, the pressure detection sensitivity of the pressure sensor 1 can be improved as compared with the first embodiment.

According to the second embodiment of the invention described above, the pressure transmission rod 3 is provided at a location positioned more inside the engine than the element providing part 3b when the pressure sensor 1 is attached to the engine, and includes the pressure transmission part 3a which transmits the pressure to the element providing part 3b. The pressure detection element 5a is provided in the element providing part 3b where the center of the pressure detection element 5a in the insertion direction of the pressure sensor 1 when the pressure sensor 1 is attached to the engine is located closer to the pressure transmission part 3a than the center of the element providing part 3b. As a result, deformation of inclination of the pressure transmission part 3a is inhibited, and the pressure detection sensitivity of the pressure sensor 1 can be improved.

In the second embodiment of the invention described above, an example of improving the pressure detection sensitivity is shown in which the length of the pressure transmission part 3a is the same as that in the first embodiment, but the length of the pressure transmission part 3a may be longer than that in the first embodiment, and a decrease in the pressure detection sensitivity due to this may be compensated by the pressure detection sensitivity improvement effect according to the present embodiment. In this way, since the pressure detection unit 5 including the circuit unit 5b can be moved away from the combustion chamber of the engine, the temperature rise of the circuit unit 5b can be inhibited while maintaining the pressure detection sensitivity.

Third Embodiment

Next, a third embodiment of the invention will be described. In the present embodiment, an example in which the pressure detection sensitivity is further improved by a method different from that described in the second embodiment based on the pressure sensor 1 described in the first embodiment will be described.

FIG. 10 is an enlarged cross-sectional view of a part including the pressure detection structure of the pressure sensor 1 according to the third embodiment of the invention. In the present embodiment, the shape of the element providing part 3b is different from that of the structure of the first embodiment described with reference to FIG. 5. Specifically, in the structure shown in FIG. 10, the element providing part 3b has a flat providing surface 3d on which the pressure detection unit 5 including the pressure detection element 5a is provided, and a cut surface 3e which is provided on a side opposite to the providing surface 3d and has a step part 3f. The position of the step part 3f on the cut surface 3e is farther rearward in the axial direction of the pressure sensor 1, that is, away from the combustion chamber of the engine than the position of the step formed at a boundary part between the pressure transmission part 3a and the element providing part 3b on the providing surface 3d on the opposite side. Accordingly, the detection sensitivity of the pressure sensor 1 with respect to the combustion pressure of the engine is further improved than in the first embodiment. Other structures are the same as those of the first embodiment.

The reason why the pressure detection sensitivity of the pressure sensor 1 is improved in the present embodiment will be described below with reference to FIG. 11. FIG. 11 is a schematic view illustrating a deformed state of the element providing part 3b during pressure receiving in the third embodiment of the invention.

In the deformed state of the element providing part 3b during pressure receiving in the structure of the present embodiment, as shown in FIG. 11, deformation occurs in the element providing part 3b that the providing surface 3d on which the pressure detection element 5a is provided becomes a concave. This is because when the element providing part 3b is made to have a thick shape and has an improved rigidity as compared with the first embodiment and the step part 3f is provided on the cut surface 3e opposite to the providing surface 3d in the element providing part 3b, the providing surface 3d is easily deformed to a concave. In this way, by deforming the surface on which the pressure detection unit 5 is provided to be a concave, compression due to bending is applied to the pressure detection element 5a in addition to the compression of the pressure sensor 1 in axial direction. As a result, the pressure detection sensitivity of the pressure sensor 1 can be improved as compared with the first embodiment.

According to the third embodiment of the invention described above, the pressure transmission rod 3 is provided at a location positioned more inside the engine than the element providing part 3b when the pressure sensor 1 is attached to the engine, and includes the pressure transmission part 3a which transmits the pressure to the element providing part 3b. The element providing part 3b has the providing surface 3d on which the pressure detection element 5a is provided and the cut surface 3e which is provided on a side opposite to the providing surface 3d and has the step part 3f. As a result, it is possible to apply the compression by bending to the pressure detection element 5a to improve the pressure detection sensitivity of the pressure sensor 1.

In the third embodiment of the invention described above, similarly to the second embodiment, the length of the pressure transmission part 3a can be configured longer than that of the first embodiment. That is, in the third embodiment of the invention, an example of improving the pressure detection sensitivity is shown in which the length of the pressure transmission part 3a is the same as that in the first embodiment, but the length of the pressure transmission part 3a may be longer than that in the first embodiment, and the decrease in the pressure detection sensitivity due to this may be compensated by the pressure detection sensitivity improvement effect according to the present embodiment. In this way, since the pressure detection unit 5 including the circuit unit 5b can be moved away from the combustion chamber of the engine, the temperature rise of the circuit unit 5b can be inhibited while maintaining the pressure detection sensitivity.

In addition, in the third embodiment of the invention described above, the providing position of the pressure detection unit 5 in the element providing part 3b is the same as that in the first embodiment, but may also be same as that in the second embodiment. Therefore, even in a configuration in which the second embodiment is modified, the same effects described above can be obtained.

Fourth Embodiment

Next, a fourth embodiment of the invention will be described. In the present embodiment, an example in which the temperature rise of the pressure detection circuit is further inhibited in the pressure sensor 1 described in the first embodiment will be described.

FIG. 12 is an enlarged cross-sectional view of a part including the pressure detection structure of the pressure sensor 1 according to the fourth embodiment of the invention. In the present embodiment, as compared with the structure of the first embodiment described in FIG. 5, a thermally conductive material 15 is added between the pressure detection unit 5 and the contact part 9. The thermally conductive material 15 is made of, for example, a resin material such as thermally conductive rubber, an epoxy resin, a silicone resin, and an urethane resin mixed with thermally conductive powder such as metal powder and ceramic powder, or made of a material softer than the casing 6 and the high rigidity part 3c such as thermally conductive grease. The thermally conductive material 15 is filled between the inner side of the casing 6 and the high rigidity part 3c, and improves the heat dissipation property of the pressure detection unit 5 from the circuit unit 5b to the contact part 9 via the element providing part 3b and the high rigidity part 3c.

According to the fourth embodiment of the invention described above, the pressure sensor 1 further includes the thermally conductive material 15 disposed between the pressure detection unit 5 including the circuit unit 5b and the contact part 9. In this way, the heat dissipation property from the circuit unit 5b can be improved, and the temperature rise of the circuit unit 5b can be inhibited. Further, since the thermally conductive material 15 is softer than the casing 6 and the high rigidity part 3c, the influence of stress due to the deformation of the casing 6 or the like is small. Therefore, the temperature rise of the circuit unit 5b can be inhibited without adversely influencing the sensor output.

In the third embodiment of the invention described above, an example in which the thermally conductive material 15 is filled up to the high rigidity part 3c is shown, but the thermally conductive material 15 may be further filled around the element providing part 3b to cover the pressure detection unit 5. At this time, it is desirable that the thermally conductive material 15 is not in contact with the cover 4 such that the heat inside the engine is not transferred to the pressure detection unit 5 via the cover 4 and the thermally conductive material 15. With such a configuration, the temperature rise of the pressure detection unit 5 can be further inhibited.

(Modification of Thermally Conductive Material)

In the fourth embodiment of the invention described above, the thermally conductive material disposed between the pressure detection unit 5 and the contact part 9 may be in another shape. A modification of the thermally conductive material will be described below with reference to FIG. 13.

FIG. 13 illustrates modifications of the thermally conductive material in the pressure sensor 1. As shown in FIG. 13(a), a configuration may be obtained in which the high rigidity part 3c is extended to the inside of the casing 6, and a thermally conductive material 16 is filled therebetween. Further, as shown in FIG. 13(b) a configuration may be obtained in which the inside of the casing 6 may be expanded, and a thermally conductive material 17 may be filled between the inside of the casing 6 and the high rigidity part 3c. The material of the thermally conductive materials 16 and 17 is the same as that of the thermally conductive material 15 described in FIG. 12.

Embodiments and various modifications described above are merely examples, and the invention is not limited to these contents as long as the characteristics of the invention are not impaired. In addition, although various embodiments and modifications have been described above, the invention is not limited to these contents. Other embodiments that are considered within the scope of the technical idea of the invention are also included within the scope of the invention.

The disclosure content of the following priority basis application is incorporated herein by reference.

Japanese Patent Application No. 035081 (Feb. 27, 2017)

REFERENCE SIGN LIST 1 pressure sensor
2 diaphragm
3 pressure transmission rod
3a pressure transmission part
3b element providing part
3c high rigidity part
4 cover
5 pressure detection unit
5a pressure detection element
5b circuit unit
6 casing
7 terminal part
8 signal line
9 contact part
10 screw part
11 stress absorbing part
12 contact member
13 O-ring
14 thermally conductive elastic body
15, 16, 17 thermally conductive material

The invention claimed is:

1. A pressure sensor which detects a combustion pressure of an engine, the pressure sensor comprising:
   a contact part which is in direct or indirect contact with a casing of the engine when the pressure sensor is attached to the engine; and
   a pressure detection unit which detects the combustion pressure and outputs a signal corresponding to the combustion pressure,
   wherein the pressure detection unit includes a pressure detection element which detects the combustion pressure and outputs a signal, and a circuit unit which converts the signal obtained from the pressure detection element into a signal corresponding to the combustion pressure, and
   the pressure detection unit is provided at a location positioned more inside the engine than the contact part when the pressure sensor is attached to the engine;
   a pressure transmission mechanism which transmits the combustion pressure to the pressure detection element, wherein at least a part of the pressure transmission mechanism is provided at a location positioned more inside the engine than the circuit unit when the pressure sensor is attached to the engine;
   a stress absorbing part which is between the contact part and the pressure detection unit and is configured to absorb a deformation stress generated by contacting the contact part with the casing of the engine;

wherein the pressure transmission mechanism includes an element providing part on which the pressure detection element is provided, and a high rigidity part which is disposed between the element providing part and the stress absorbing part and has a rigidity higher than that of the element providing part.

2. The pressure sensor according to claim 1, wherein the pressure transmission mechanism includes an element providing part on which the pressure detection element is provided, and a high rigidity part which is disposed between the element providing part and the contact part and has a rigidity higher than that of the element providing part.

3. The pressure sensor according to claim 1, further comprising:

a thermally conductive material which is disposed between the circuit unit and the contact part.

4. The pressure sensor according to claim 1, wherein the pressure transmission mechanism is provided at a location positioned more inside the engine than the element providing part when the pressure sensor is attached to the engine, and further includes a pressure transmission part which transmits a pressure to the element providing part, and the pressure detection element is provided at a position in the element providing part where a center of the pressure detection element in an insertion direction of the pressure sensor when the pressure sensor is attached to the engine is closer to the pressure transmission part than a center of the element providing part.

5. The pressure sensor according to claim 1, wherein the pressure transmission mechanism is provided at a location positioned more inside the engine than the element providing part when the pressure sensor is attached to the engine, and further includes a pressure transmission part which transmits a pressure to the element providing part, and the element providing part has a providing surface on which the pressure detection element is provided, and a cut surface which is provided on a side opposite to the providing surface and has a step part.

\* \* \* \* \*